US009277214B2

(12) United States Patent
Davies

(10) Patent No.: US 9,277,214 B2
(45) Date of Patent: Mar. 1, 2016

(54) SUB-PICTURE HIERARCHICAL QP CODING

(71) Applicant: CISCO TECHNOLOGY, INC., San Jose, CA (US)

(72) Inventor: Thomas Davies, Guildford (GB)

(73) Assignee: Cisco Technology, Inc., San Jose, CA (US)

( * ) Notice: Subject to any disclaimer, the term of this patent is extended or adjusted under 35 U.S.C. 154(b) by 206 days.

(21) Appl. No.: 13/768,426

(22) Filed: Feb. 15, 2013

(65) Prior Publication Data

US 2014/0233635 A1    Aug. 21, 2014

(51) Int. Cl.
*H04N 7/12* (2006.01)
*H04N 19/124* (2014.01)
*H04N 19/157* (2014.01)
*H04N 19/174* (2014.01)

(52) U.S. Cl.
CPC ......... *H04N 19/0009* (2013.01); *H04N 19/124* (2014.11); *H04N 19/157* (2014.11); *H04N 19/174* (2014.11)

(58) Field of Classification Search
CPC .................. H04N 19/00781; H04N 19/00266; H04N 19/00284; H04N 19/0009; H04N 19/00169; H04N 19/00096; H04N 19/00357; H04N 19/00218; H04N 19/00472; H04N 19/00278; H04N 19/00818; H04N 19/00072; H04N 19/00; H04N 19/00109; H04N 19/00296; H04N 19/00787; H04N 7/26074; H04N 7/26085; H04N 7/26122; H04N 7/26265; H04N 7/26313; H04N 7/26946; H04N 7/50; H04N 19/00084; H04N 19/00424; H04N 19/00569; G11B 27/034; G11B 2220/2512; G11B 27/036; G11B 27/105; G06T 1/0028; G06T 2201/0202; G06T 2207/10016; G06T 7/2013; G06T 7/2033
See application file for complete search history.

(56) References Cited

U.S. PATENT DOCUMENTS

| 6,026,217 | A  | * | 2/2000  | Adiletta   | 709/247    |
|-----------|----|---|---------|------------|------------|
| 2003/0081674 | A1 | * | 5/2003  | Malvar     | 375/240.03 |
| 2007/0258519 | A1 | * | 11/2007 | Srinivasan | 375/240.03 |
| 2009/0060035 | A1 | * | 3/2009  | He et al.  | 375/240.12 |
| 2009/0232214 | A1 | * | 9/2009  | Ghanbari   | 375/240.16 |
| 2011/0122943 | A1 | * | 5/2011  | Kadono     | 375/240.03 |

FOREIGN PATENT DOCUMENTS

EP    2 216 998 A1    8/2010

OTHER PUBLICATIONS

Danny Hong, et al., "H.264 Hierarchical P Coding in the Context of Ultra-Low Delay, Low Complexity Applications", 28th Picture Coding Symposium, PCS2010, Dec. 8-10, 2010, Nagoya, Japan, pp. 146-149.

* cited by examiner

*Primary Examiner* — Tat Chio
(74) *Attorney, Agent, or Firm* — Lempia Summerfield Katz LLC

(57) ABSTRACT

A method including: dividing a first video frame into a predetermined plurality of regions; assigning a quantization parameter to each of the predetermined plurality of regions in accordance with a first predetermined pattern of quantization parameters, the quantization parameters not being all the same; dividing video frames, subsequent to the first video frame, into the predetermined plurality of regions; and assigning a quantization parameter to each of the predetermined plurality of regions in the video frames subsequent to the first video frame, in accordance with another predetermined pattern, different from the first predetermined pattern.

20 Claims, 6 Drawing Sheets

```
H H H H   H H H H              L L L L   L L L L              L L L L   L L L L              L L L L   L L L L
L L L L   L L L L              H H H H   H H H H              L L L L   L L L L              L L L L   L L L L
L L L L   L L L L              L L L L   L L L L              H H H H   H H H H              L L L L   L L L L
L L L L   L L L L              L L L L   L L L L              L L L L   L L L L              H H H H   H H H H
      in frame 0;                    in frame 1;                    in frame 2;                    in frame 3
```

Fig. 5

SUB-PICTURE HIERARCHICAL QP CODING

TECHNOLOGICAL FIELD

The exemplary embodiments described herein pertain to video coding.

BACKGROUND

In the baseline profile of H.264/AVC, two picture coding techniques are available. The first, intra coding, predicts the content of the input video picture (i.e., the picture being coded) using decoded luma and chroma samples from regions in the picture that have been coded earlier (and would therefore be available to a decoder). The second, predictive coding, predicts the content of the input video picture using previously coded pictures called reference pictures.

A traditional videoconference may begin with an intra-coded or I picture followed by predicted or P pictures. Unlike applications requiring random access (e.g., digital video recordings) which insert periodic I pictures, a videoconference typically uses one I picture at the beginning of transmission and never again (IPPP coding), except in special situations (e.g., error recovery). Hierarchical-P picture (HPP) coding includes a prediction structure that does not always reference the picture immediately preceding the input. Rather, the prediction structure in HPP coding is constructed so that the input pictures are decomposed into sets or temporal layers that offer temporal scalability.

BRIEF DESCRIPTION OF THE DRAWINGS

A more complete appreciation of the technological advancement and many of the attendant advantages thereof will be readily obtained as the same becomes better understood by reference to the following detailed description when considered in connection with the accompanying drawings, wherein:

FIG. 5 illustrates an exemplary prediction structure where the frames are divided into horizontal stripes;

DETAILED DESCRIPTION OF THE PREFERRED EMBODIMENTS

Overview

Figure 1:
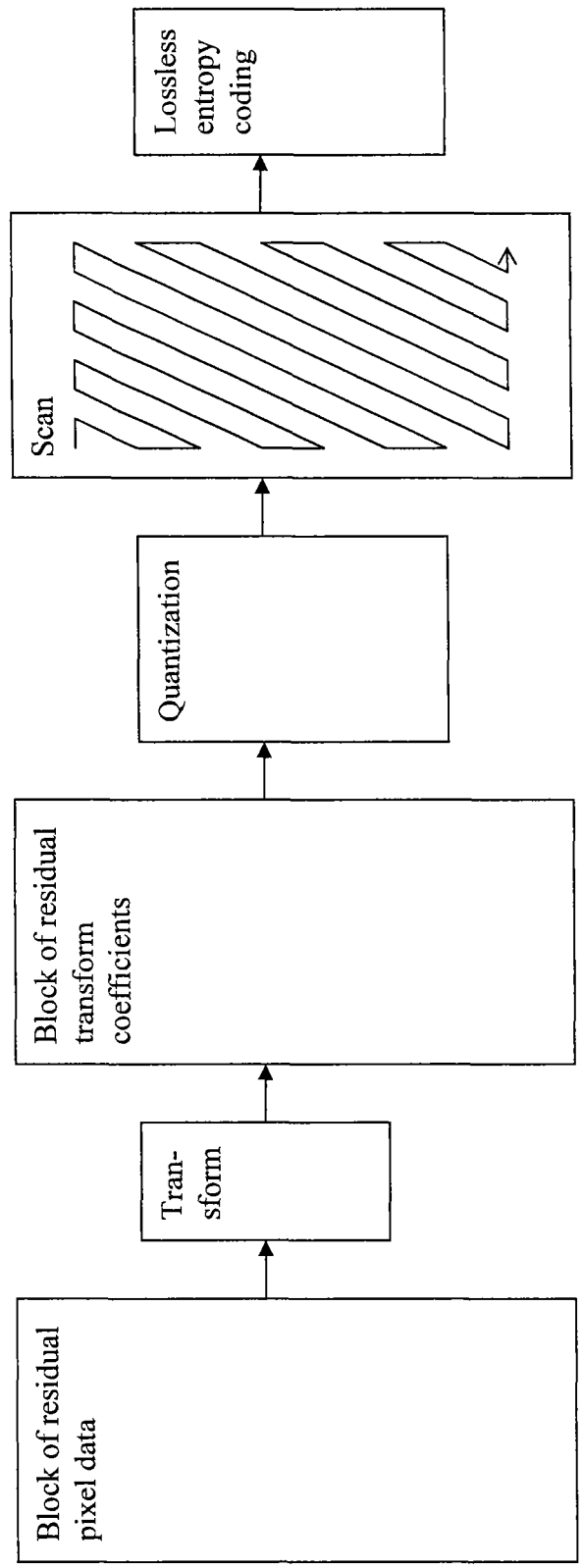
FIG. 1 illustrates the different steps in an example of an encoding process.

A method including: dividing a first video frame into a predetermined plurality of regions; assigning a quantization parameter to each of the predetermined plurality of regions in accordance with a first predetermined pattern of quantization parameters, the quantization parameters not being all the same; dividing video frames, subsequent to the first video frame, into the predetermined plurality of regions; and assigning a quantization parameter to each of the predetermined plurality of regions in the video frames subsequent to the first video frame, in accordance with another predetermined pattern, different from the first predetermined pattern.

Exemplary Embodiments

Referring now to the drawings, wherein like reference numerals designate identical or corresponding parts throughout the several views.

Video Encoding and Decoding

Representing moving pictures requires bulk information as digital video typically is described by representing each pixel in a picture with 8 bits (1 Byte). Such uncompressed video data results in large bit volumes, and may not be transferable over conventional communication networks and transmission lines in real time due to limited bandwidth. Thus, enabling real time video transmission requires a large extent of data compression. Common video coding methods are described in standards such as the MPEG2, MPEG4, ITU-T/H.261 to H.264 standards. The video data undergo four main processes before transmission, namely prediction, transformation, quantization and entropy coding.

The prediction process significantly reduces the amount of bits required for each picture in a video sequence to be transferred. It takes advantage of the similarity of parts of the sequence with other parts of the sequence. Since the predictor part is known to both encoder and decoder, only the difference has to be transferred. This difference typically requires much less capacity for its representation. The prediction is mainly based on picture content from previously reconstructed pictures where the location of the content is defined by motion vectors.

A video encoder may be implemented by dividing each frame of original video data in blocks of pixels. These blocks may be of size 16×16 and may be referred to as macroblocks (MB). The blocks may be larger (e.g. 64×64) and may be rectangular, for instance at frame boundaries.

For each block of original pixel data, the encoding may be performed in the following steps:

Produce prediction pixels using reconstructed pixel values from i) the previous frame (inter prediction), or ii) previously reconstructed pixels in the current frame (intra prediction). Depending on the prediction type, the block is classified as an inter block or an intra block.

Compute the difference (block of residual pixel data) between each original pixel and the corresponding prediction pixel within the block.

Apply a two-dimensional transform to the difference samples resulting in a set of transform coefficients.

Quantize each transform coefficient, with a quantization parameter (QP). This is a tool for controlling the bit production and reconstructed picture quality.

Establish a scanning of the two dimensional transform coefficient data into a one dimensional set of data.

Subject the data to lossless entropy encoding.

The above steps, which are generally illustrated in FIG. 1, are listed in a natural order for the encoder. The decoder will, to some extent, perform the operations in the opposite order and do "inverse" operations as inverse transform instead of transform and de-quantization instead of quantization.

At the encoder, as well as at the decoder, the pictures will be reconstructed. Due to the quantization step, the reconstructed pictures will differ from the non-compressed input pictures. However, the reconstructed pictures may be identical at the encoder and decoder side.

Figure 2:
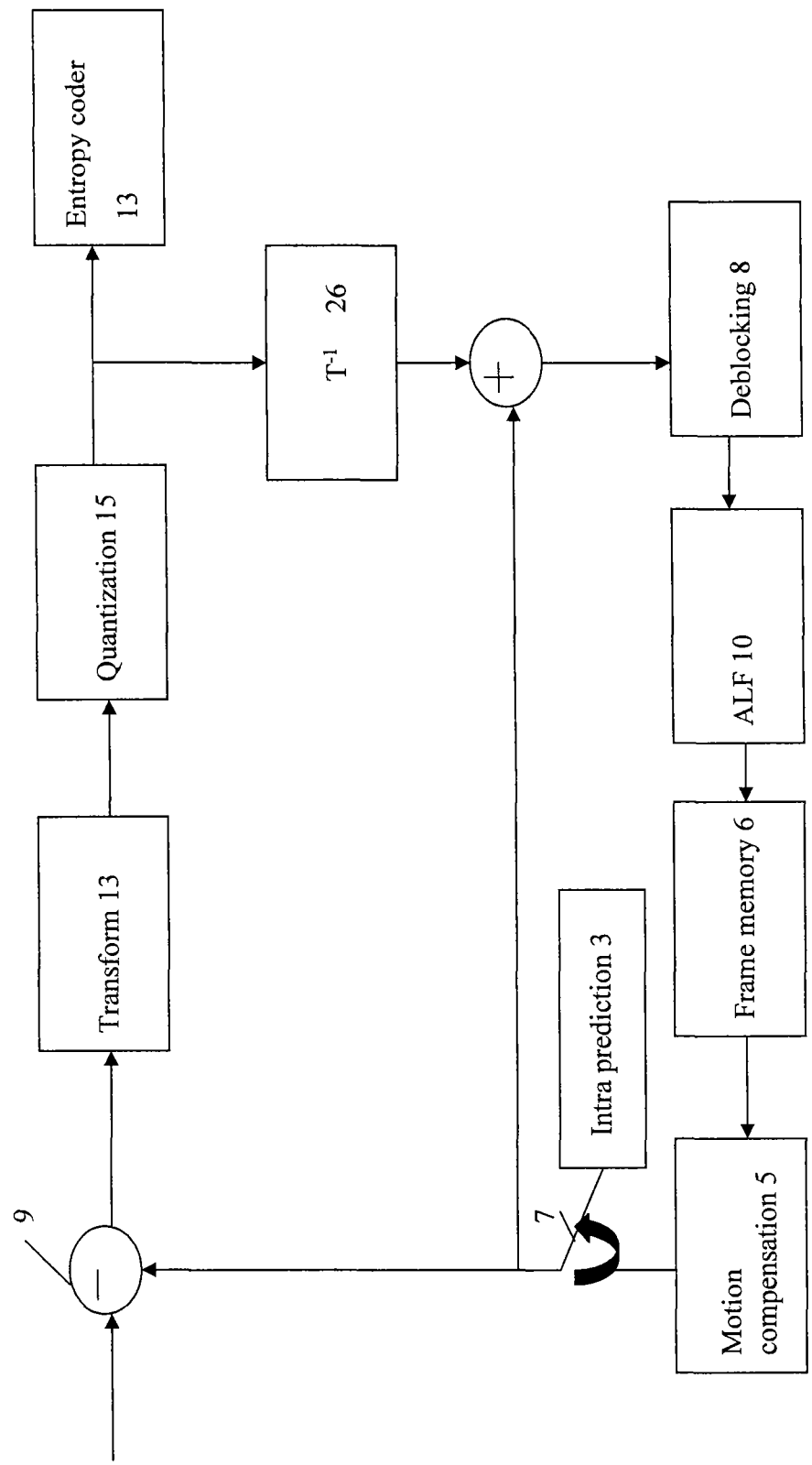
FIG. 2 is a block diagram of an example of a video encoder.
Figure 3:
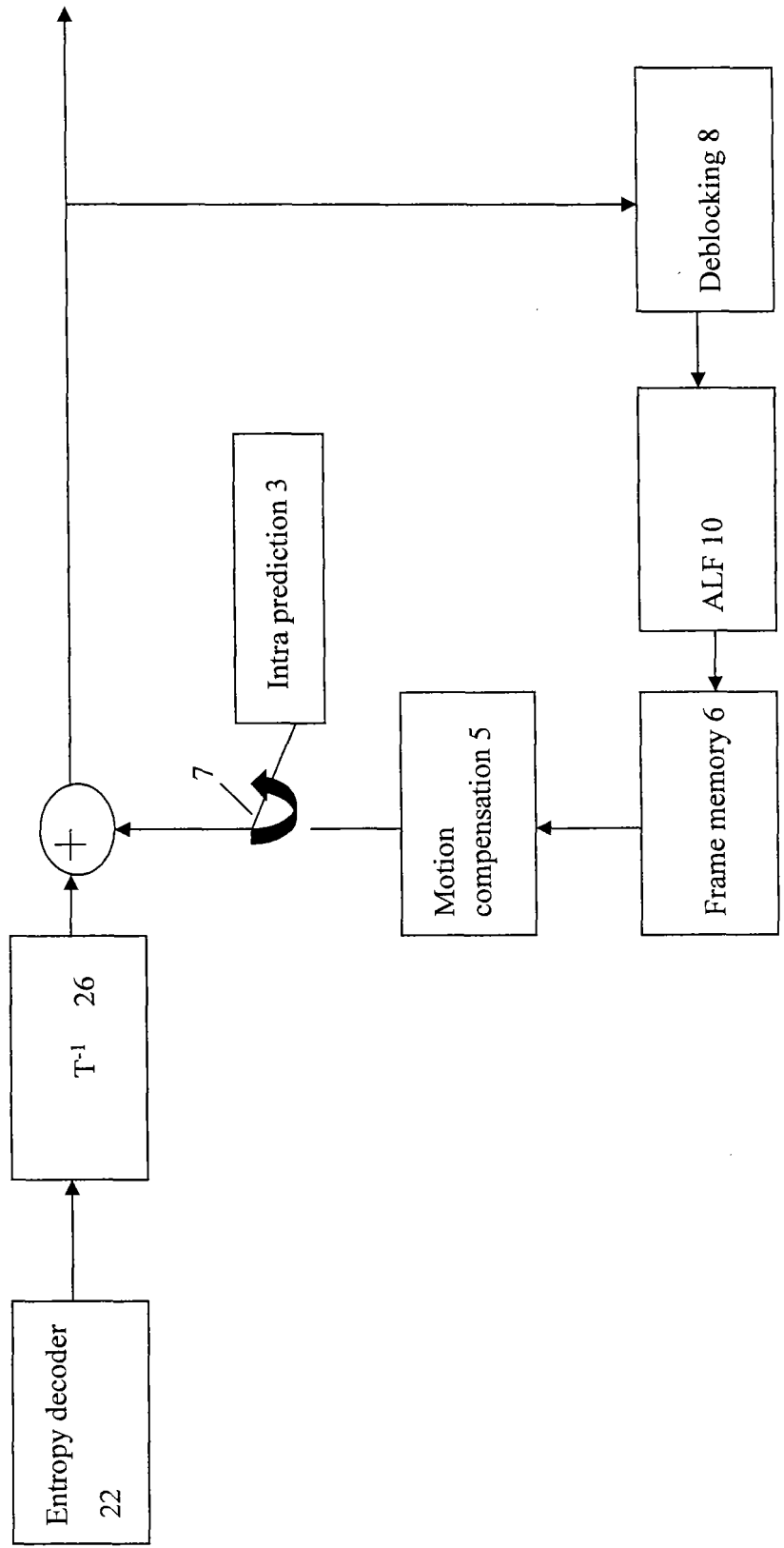
FIG. 3 is a block diagram of an example of a video decoder.

An exemplary implementation of an encoding and decoding process for video compression is discussed in further detail in reference to FIGS. 2 and 3. In FIG. 2, a current frame as well as a prediction frame are input to a subtractor 9. The subtractor 9 is provided with input from an intra prediction processing path 3 and a motion compensation processing path 5, the selection of which is controlled by switch 7. Intra prediction processing is selected for finding similarities within the current image frame, and is thus referred to as "intra" prediction. Motion compensation has a temporal component and thus involves analysis between successive frames that is referred to as "inter" prediction.

The output of the switch 7 is subtracted from the pixels of the current frame in a subtractor 9, prior to being subjected to a two dimensional transform process 13. The transformed coefficients are then subjected to quantization in a quantizer 15 and then subject to an entropy encoder 17. Entropy encoding removes redundancies without losing information, and is referred to as a lossless encoding process. Subsequently, the encoded data is arranged in network packets via a packetizer, prior to being transmitted in a bit stream.

However, the output of the quantizer 15 is also applied to an inverse transformer 26, the output of which is used for assisting in prediction processing. The output is applied to a deblocking filter 8, which suppresses some of the sharpness in the edges to improve clarity and better support prediction processing. The output of the deblocking filter 8 is applied to a frame memory 6, which holds the processed image pixel data in memory for use in subsequent motion processing.

The corresponding decoding process for each block can be described as follows (as indicated in FIG. 3). After entropy decoding 22 (to produce the quantized transform coefficients) and two dimensional inverse transformation 26 on the quantized transform coefficient to provide a quantized version of the difference samples, the resultant image is reconstructed after adding the inter prediction and intra prediction data previously discussed.

In video encoders, blocks may be divided into sub-blocks. Typically, the blocks are of fixed (square) size, while the sub-blocks can be of various e.g. (rectangular) shapes. Also, the partitioning into sub-blocks will typically vary from one block to another.

Inter prediction is typically achieved by deriving a set of motion vectors for each sub-block. The motion vectors define the spatial displacement between the original pixel data and the corresponding reconstructed pixel data in the previous frame. Thus, the amount of data that needs to be transmitted to a decoder can be greatly reduced if a feature in a first frame can be identified to have moved to another location in a subsequent frame. In this situation, a motion vector may by used to efficiently convey the information about the feature that has changed position from one frame to the next.

Intra prediction is typically achieved by deriving an intra direction mode for each sub-block. The intra direction mode defines the spatial displacement between the original pixel data and the previously reconstructed pixel data in the current frame.

Hierarchical Prediction Structures

Conventional hierarchical prediction structures, in which the QPs vary systematically between frames my provide improvements in quality. However, large variations in frame sizes (resulting from the varying QPs) between frames may require increased buffer sizes at the encoder and decoder and therefore more latency. In software they may also require more time to encode or decode, increasing latency further. Hierarchical QP structures have drawbacks of increasing bit rate variation between frames, which requires larger frame buffers in order to achieve a constant or near constant output frame rate at the decoder. Such large variations may also make rate control mechanisms less stable, especially when very low delay is required.

Hierarchical QP structures may be based upon power-of-two patterns, where $2^N$ frames are divided into N+1 sets of size: 1 (top quality frame) plus subsets of size $1, 2, 4, \ldots, 2^{N-1}$ of increasingly lower quality/higher QP.

The simplest example (N=1) is when the even frames $F_{2n}$ are high quality and the odd frames $F_{2n+1}$ are low quality, illustrated below:

| $F_0$ | | $F_2$ | | $F_4$ | | $F_6$ | | $F_8$ | | $F_{10}$ |
|---|---|---|---|---|---|---|---|---|---|---|
| | $F_1$ | | $F_3$ | | $F_5$ | | $F_7$ | | $F_9$ | |

The next example (N=2) is when there are three levels with $F_{4n}$ the highest quality, $F_{4n+2}$ the next highest (i.e., medium quality), and $F_{2n+1}$ the lowest quality:

| $F_0$ | | | | $F_4$ | | | | $F_8$ | | | | $F_{12}$ |
|---|---|---|---|---|---|---|---|---|---|---|---|---|
| | | $F_2$ | | | | $F_6$ | | | | $F_{10}$ | | |
| | $F_1$ | | $F_3$ | | $F_5$ | | $F_7$ | | $F_9$ | | $F_9$ | |

When N=3, the structure looks like this:

| $F_0$ | | | | | | | | $F_8$ | | | | |
|---|---|---|---|---|---|---|---|---|---|---|---|---|
| | | | | $F_4$ | | | | | | | | $F_{12}$ |
| | | $F_2$ | | | | $F_6$ | | | | $F_{10}$ | | |
| | $F_1$ | | $F_3$ | | $F_5$ | | $F_7$ | | $F_9$ | | $F_9$ | |

A typical QP difference between the highest and lowest layers might be between 4 and 7, with other layers distributed between these.

Another typical structure is to have just 2 layers, with a difference of N frames between them, for example when N=4:

| $F_0$ | $F_4$ | $F_8$ | $F_{12}$ | $F_{16}$ | ... |
|---|---|---|---|---|---|
| $F_1 F_2 F_3$ | $F_5 F_6 F_7$ | $F_9 F_{10} F_{11}$ | $F_{13} F_{14} F_{15}$ | | ... |

In this case a typical QP difference between high and low layers might be 3, 4, or 5 and a typical frame distance might be 2, 3, 4, 6 or 8.

Figure 4:
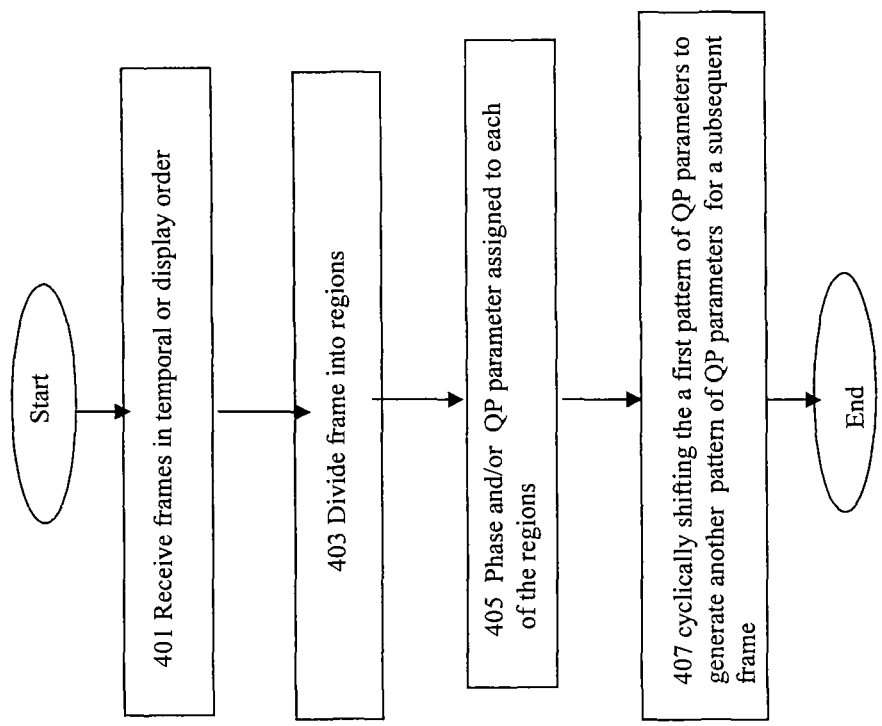
FIG. 4 illustrates an exemplary method of sub-picture hierarchical QP coding.

FIG. 4 illustrates a method of applying QP coding to video on a sub-frame basis instead of on a frame basis. In step 401, frames are received in either temporal order or display order.

In step 403, a first video frame is divided into a predetermined plurality of regions. FIG. 5 shows an example where the video frame is divided into horizontal stripes. Vertical stripes could also be used. First, as in first video frame, does not necessarily mean the frame at the beginning of the stream. Rather, first is used to merely distinguish from other frames in the stream, as does other numerical identifiers.

The short side of the stripe is at least one pixel. The frames may be divided into regions of other shapes and sizes, such as rectangles or squares, as long as each region includes at least one pixel in width. All the regions in a frame may have the same size or have different sizes.

In HEVC (high efficiency video coding or H.265), tiles are defined to aid parallelization. These tiles represent rectangular areas of a frame. Therefore, the frames may be divided into regions that are the same as the tiles used in HEVC. In both H.265 and H.264, slices consisting horizontal rows of macroblocks (H.264) or Coding Tree Units (H.265) are possible. Therefore, the frames may also be divided into the slices of H.264 or H.265.

In step 405, a quantization parameter is assigned to each of the predetermined plurality of regions. Not every region has the same quantization parameter. Every region may have a different quantization parameter, or only some regions may have different quantization parameters. There may be two different quantization parameters used within a frame, wherein they may indicate high-quality or low quality. However, there may also be three, four, or more quantization parameters used in a given frame.

Each region may be assigned a phase, which determines its position in the prediction structure. A quantization parameter may then be associated with each phase. Some phases may have the same quantization parameter and the number of phases may not be equal to the number of regions. For example, a frame could be divided into four regions, two of which are classified as P3 (phase 3) and one of which is classified as P2 (phase 2) and one of which is classified as P1 (phase 1).

In step 407, these four regions may individually cycle through the prediction structure as indicated below, which may create a new pattern for a subsequent frame:

TABLE 1

|  | Frame 1 | Frame 2 | Frame 3 | Frame 4 | Frame 5 |
|---|---|---|---|---|---|
| Cycle for Region 1 | P1 | P2 | P3 | P4 | P1 |
| Cycle for Region 2 | P3 | P4 | P1 | P2 | P3 |
| Cycle for Region 3 | P2 | P3 | P4 | P1 | P2 |
| Cycle for Region 4 | P3 | P4 | P1 | P2 | P3 |

Five frames are provided as an example in the above table, and the cyclic pattern in the frames may continue to repeat for subsequent frames.

FIG. 5 provides another illustration where the regions are horizontal stripes that cycle through various frames. FIG. 5 is an example of a two-layer structure with N=4, and ¼ of the blocks are categorized as high-quality (H) and ¾ of the blocks are categorized as low-quality (L). The high-quality stripes moves across the frames progressively as the frames progress.

While FIG. 5 illustrates the relative values of high and low for QP, QP may have integer values ranging from 1 to 51. The value of QP for the regions or phases in the frames may be selected to achieve a desired average value for each of the frames. With a constant overall QP for each of the frames, lower latency may be achieved, relative to conventional encoding algorithms, because coded frames are output with a constant average bit rate.

FIG. 5 illustrates how a modulation of QP on sub-picture level is achieved. In FIG. 5, subsequent frames (those after the initial frame 0) are divided into the same plurality of regions as in frame 0. The subsequent frames are assigned a quantization parameter for each of the plurality of regions in a pattern different from the preceding frame. In this example, a difference between the frames 0-3 is achieved by cyclically modifying the pattern in frame 0 so that the pattern in frame 0 cyclically progresses through the subsequent frames. The pattern in FIG. 5, frame 1, is generated by a cyclical shift of the first pattern (that of frame 0). Such a cyclical shift may be subsequently performed for each frame based on the immediately preceding frame. The pattern may repeat as the number of frames increases or, in some situations, each of the frames may have their own unique pattern (however, such a situation may be dependent upon the size/number of the regions and the number of frames)

In another embodiment, pertaining to the prediction aspect of coding, the region in one frame does not need to be predicted from only the corresponding region in a previous frame (i.e., a reference that is used to generate a residual in the prediction process). If motion is small, the referenced regions are mostly in the corresponding region within the reference. If the same reference for each region is used, then the previous assumption is incorrect. By way of a non-limiting example, suppose there are two phases and in the top half of the frame is high quality (H) and the bottom half of the frame is low quality:

TABLE 2

| Top Half | H | L | H | L |
|---|---|---|---|---|
| Bottom Half | L | H | L | H |
| Frame # | 0 | 1 | 2 | 3 |

Taking frame 2, if prediction is based just from the previous frame 1, then the prediction for the high quality region in frame 2 is based on a low quality area in frame 1, assuming motion is small. It may be better to predict the high quality area in frame 2 from frame 0 and the low quality area of frame 2 from frame 1.

The above example, two references are used in conjunction with two phases. If there are more phases (see Table 1), the reference may vary by sub-picture to make sure a high quality area is likely to be included in the prediction process.

Considering the prediction process with Table 1, along with the assumption that higher phase means higher QP, the first region of frame 5 may refer to frame 4 and frame 1, while the remaining regions refer to frame 4 and frame 3. This ensures that a reference of higher quality is reasonably likely.

Figure 6:
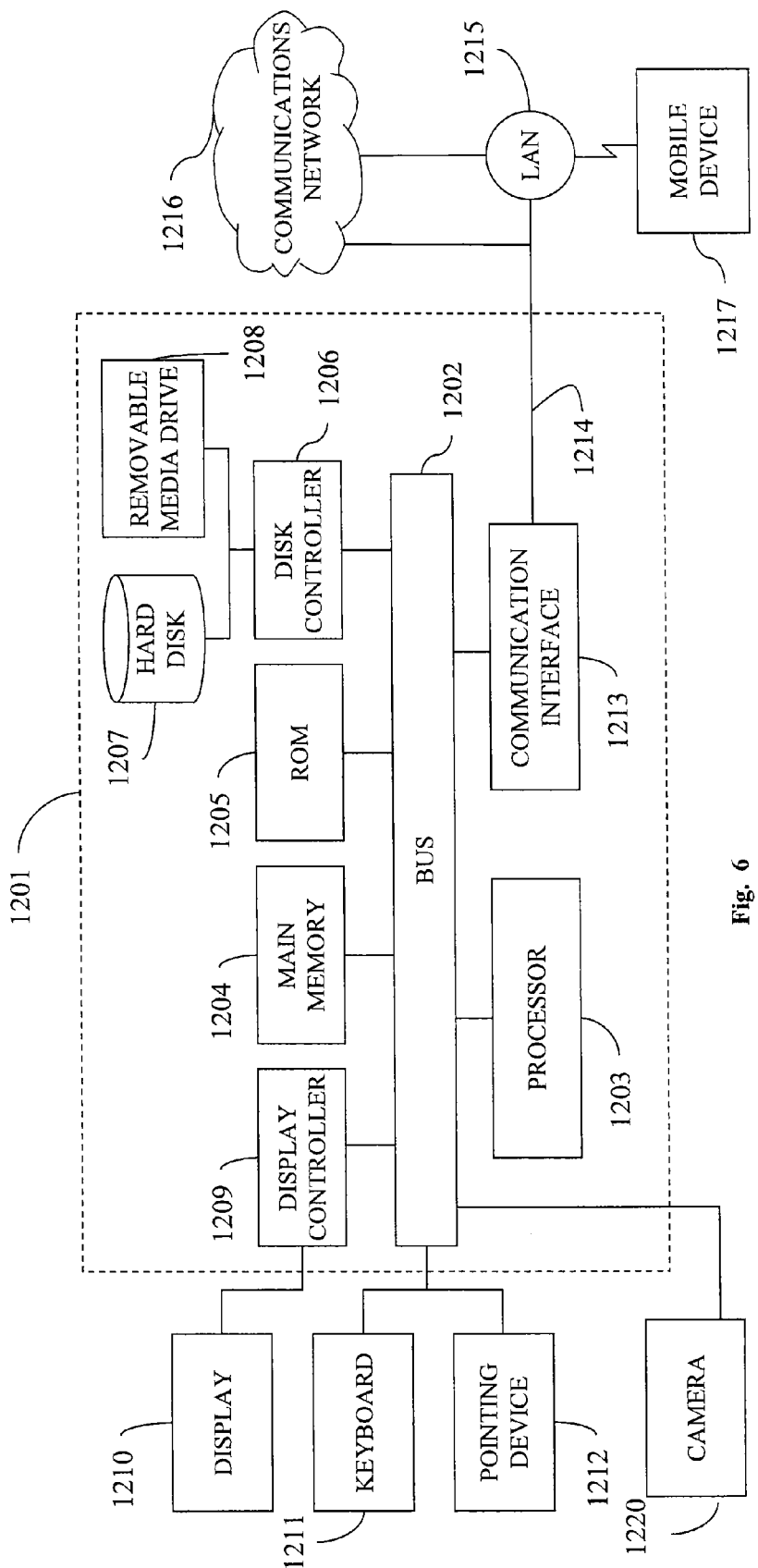
FIG. 6 illustrates an exemplary computer system, which may be programmed as either an encoder or decoder.

FIG. 6 illustrates a computer system 1201 upon which the embodiments discussed above may be implemented. The computer system 1201 may be programmed to implement a computer based video conferencing endpoint that includes a video encoder or decoder for processing real time video images. The computer system 1201 includes a bus 1202 or other communication mechanism for communicating information, and a processor 1203 coupled with the bus 1202 for processing the information. While the figure shows a signal block 1203 for a processor, it should be understood that the processors 1203 represent a plurality of processing cores, each of which can perform separate function. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the embodiments discussed herein and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present embodiment includes software for controlling the computer system 1201, for driving a device or devices for implementing the technolgoical advancement, and for enabling the computer system 1201 to interact with a human user. Such software may include, but is not limited to, device drivers, operating systems, development tools, and applications software. Such computer readable media further includes the computer program product for performing all or a portion (if processing is distributed) of the processing performed in implementing the technological advancement.

The computer code devices of the exemplary embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the processing remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Numerous modifications and variations of the present disclosure are possible in light of the above teachings. It is therefore to be understood that within the scope of the appended claims, the technological advancement may be practiced otherwise than as specifically described herein.

The invention claimed is:

1. A method comprising:
   dividing, with an encoding apparatus, a first video frame into a first region, a second region, and a third region;
   assigning, with the encoding apparatus, a first quantization parameter to the first region, a second quantization parameter to the second region, and a third quantization parameter to the third region in accordance with a first predetermined pattern of quantization parameters;
   dividing, with the encoding apparatus, video frames, subsequent to the first video frame, into the first, second, and third regions; and
   assigning, with the encoding apparatus, the second quantization parameter to the third region and the third quantization parameter to the first region in at least one video frame subsequent to the first video frame.

2. The method of claim 1, wherein the predetermined plurality of regions are horizontal stripes with at least one pixel in a width and length dimension.

3. The method of claim 2, wherein the horizontal stripes have a same size.

4. The method of claim 1, wherein the plurality of regions are each rectangular.

5. The method of claim 1, further comprising:
   cyclically shifting, with the encoding apparatus, the second quantization parameter to the first region and the first quantization parameter to the second region.

6. The method of claim 5, wherein the cyclically shifting is performed for each of the video frames, subsequent to the first video frame.

7. The method of claim 1, wherein the another predetermined pattern results from a cyclical shift in the first predetermined pattern.

8. The method of claim 1, wherein the predetermined plurality of regions in each of the video frames, subsequent to the first video frame, is assigned a quantization parameter based on a cyclic shift in the predetermined pattern of quantization parameters of an immediately preceding frame.

9. The method of claim 1, further comprising:
   encoding, with the encoding apparatus, the first video frame using the quantization parameters assigned to the predetermined plurality of regions in the first video frame; and
   encoding, with the encoding apparatus, the video frames, subsequent to the first video frame, using the quantization parameters assigned to the predetermined plurality of regions in the video frames, subsequent to the first video frame, respectively.

10. The method of claim 1, further comprising:
    receiving, with the encoding apparatus, the first frame and the video frames, subsequent to the first video frame, in display order.

11. The method of claim 1, further comprising:
    receiving, with the encoding apparatus, the first frame and the video frames, subsequent to the first video frame, in temporal order.

12. The method of claim 1, further comprising:
    performing a prediction process with the first video frame, wherein the prediction process is based on at least one region from a plurality of reference frames.

13. A non-transitory computer readable storage medium encoded with instructions, which when executed by a computer causes the computer to implement a method comprising:
    dividing a first video frame into three or more horizontal regions;
    assigning a quantization parameter to each of the three or more horizontal regions in accordance with a first predetermined pattern of three or more quantization parameters, said quantization parameters being different;
    dividing video frames, subsequent to the first video frame, into the three or more horizontal regions; and
    assigning a quantization parameter to each of the three or more horizontal regions in the video frames subsequent to the first video frame, in accordance with another predetermined pattern, different from the first predetermined pattern.

14. An apparatus, comprising:
    a non-transitory memory that stores executable instructions; and
    a processor that executes the instructions in order to
       divide a first video frame into three or more regions, each of the three or more regions including a plurality of pixels,
       assign a different quantization parameter to each of the three or more regions in accordance with a first predetermined pattern of quantization parameters,
       divide video frames, subsequent to the first video frame, into the three or more regions, and
       assign a new quantization parameter to each of the three or more regions in the video frames subsequent to the first video frame, in accordance with another predetermined pattern, different from the first predetermined pattern.

15. The non-transitory computer readable storage medium of claim 14, wherein the first predetermined pattern and the other predetermined are cyclically repeated in the video frames subsequent to the first video frame.

16. The non-transitory computer readable storage medium of claim 14, wherein the first predetermined pattern includes a first arrangement of horizontal stripes and the other predetermined pattern includes a second arrangement of horizontal stripes.

17. The apparatus of claim 15, wherein the first predetermined pattern and the other predetermined are cyclically repeated in the video frames subsequent to the first video frame.

18. The apparatus of claim 15, wherein the first predetermined pattern includes a first arrangement of horizontal stripes and the other predetermined pattern includes a second arrangement of horizontal stripes.

19. The apparatus of claim 15, wherein the first predetermined pattern includes a high quality block at a first position and a plurality of low quality blocks, and the other predetermined pattern includes the high quality block at a second position and the plurality of low quality blocks.

20. The non-transitory computer readable storage medium of claim 14, wherein the first predetermined pattern of quantization parameters includes four different quantization parameters.

* * * * *